(12) United States Patent
Miyamoto et al.

(10) Patent No.: US 9,253,432 B2
(45) Date of Patent: Feb. 2, 2016

(54) INFORMATION PROCESSING SYSTEM, RECORDING APPARATUS, PORTABLE DEVICE, INFORMATION PROCESSING METHOD, AND PROGRAM

(75) Inventors: Masaru Miyamoto, Tokyo (JP); Hiroshige Okamoto, Kanagawa (JP); Shunji Yoshimura, Tokyo (JP); Noboru Murabayashi, Saitama (JP); Tsutomu Seki, Chiba (JP); Daisuke Negi, Tokyo (JP)

(73) Assignee: Sony Corporation (JP)

( * ) Notice: Subject to any disclaimer, the term of this patent is extended or adjusted under 35 U.S.C. 154(b) by 1777 days.

(21) Appl. No.: 12/221,508

(22) Filed: Aug. 4, 2008

(65) Prior Publication Data

US 2009/0041439 A1 Feb. 12, 2009

(30) Foreign Application Priority Data

Aug. 9, 2007 (JP) ................ P2007-207933

(51) Int. Cl.
*H04N 5/76* (2006.01)
*H04N 5/765* (2006.01)
*H04N 5/932* (2006.01)
(Continued)

(52) U.S. Cl.
CPC .............. *H04N 5/765* (2013.01); *G11B 27/034* (2013.01); *G11B 27/105* (2013.01); *H04L 67/1095* (2013.01); *H04N 21/4126* (2013.01); *H04N 21/4334* (2013.01); *H04N 21/43615* (2013.01); *H04N 21/4402* (2013.01); *H04N 21/64792* (2013.01); *H04N 5/77* (2013.01); *H04N 5/775* (2013.01); *H04N 5/781* (2013.01); *H04N 5/85* (2013.01); *H04N 5/907* (2013.01)

(58) Field of Classification Search
CPC .............. H04N 5/765; H04N 21/4126; H04N 21/8549; H04L 67/1095
USPC .................................. 386/291–299
See application file for complete search history.

(56) References Cited

U.S. PATENT DOCUMENTS 8,559,795 B2 * 10/2013 Wachtfogel et al. .......... 386/291
2002/0126986 A1 * 9/2002 Lim et al. ....................... 386/52
(Continued)

FOREIGN PATENT DOCUMENTS

EP 1102271 5/2001
EP 1271952 1/2003
(Continued)

OTHER PUBLICATIONS

"HDD/DVD Recorder HD-A940/960/970 Series User's Manual", Sep. 19, 2006, XP055001152.
(Continued)

*Primary Examiner* — David Garcia Cervetti
*Assistant Examiner* — Trong Nguyen
(74) *Attorney, Agent, or Firm* — Lerner, David, Littenberg, Krumholz & Mentlik, LLP

(57) ABSTRACT

An information processing system includes a recording apparatus and a portable device, wherein the recording apparatus includes a recording control section, a selection section, a creation section, a digest information transfer control section, an operation information reception control section, and an operation information reflection section, and wherein the portable device includes a digest information reception control section, and an operation information transfer control section.

14 Claims, 9 Drawing Sheets

(51) Int. Cl.
*H04N 5/935* (2006.01)
*G11B 27/034* (2006.01)
*G11B 27/10* (2006.01)
*H04N 21/41* (2011.01)
*H04N 21/433* (2011.01)
*H04N 21/436* (2011.01)
*H04N 21/4402* (2011.01)
*H04N 21/647* (2011.01)
*H04L 29/08* (2006.01)
*H04N 5/77* (2006.01)
*H04N 5/775* (2006.01)
*H04N 5/781* (2006.01)
*H04N 5/85* (2006.01)
*H04N 5/907* (2006.01)

(56) References Cited

U.S. PATENT DOCUMENTS

2003/0005446 A1* 1/2003 Jaff et al. .................. 725/51
2004/0025072 A1  2/2004 Mau
2005/0038877 A1  2/2005 Gupta et al.
2006/0045462 A1* 3/2006 Poslinski .................. 386/46

FOREIGN PATENT DOCUMENTS

| EP | 1569396 | 8/2005 |
| JP | 2004-304430 A | 10/2004 |
| JP | 2005-184451 A | 7/2005 |
| JP | 2005-259295 A | 9/2005 |
| JP | 2006-019996 | 1/2006 |
| JP | 2006-092621 A | 4/2006 |
| JP | 2006-202475 A | 8/2006 |
| JP | 2007-080366 A | 3/2007 |
| JP | 2007-235534 A | 9/2007 |
| WO | 03/088655 | 10/2003 |

OTHER PUBLICATIONS

Anonymous: "Lite-On IT HD-A970GX", Sep. 19, 2006, XP 055001153.

Communication from EP Application No. 08161819.1, dated Jun. 28, 2011.

European Search Report, EP 08 16 1819.

* cited by examiner

FIG. 7

SELECTIVE DELETION OF TITLES

SELECT THE TITLE TO BE TRANSFERRED.

TITLES:
- ANIMALS' ●● : SERCHING FOR A BIRD'S FAMILY
  ON BS CH. 555, AT 9:00 AM (1H00M) ON DECEMBER 13 (TUE.)
- REPORTING FROM □□, IN THE WORLD: △△△ REPRESENTING FRANCE
  ON UBT, AT 10:00 AM (0H45M) ON DECEMBER 13 (TUE.)
- SPORTS LIVE
  ON CH. 081, AT 9:00 AM (0H54M) ON DECEMBER 11 (SUN.)
- YOUR FIRST TRY AT ×××
  ON CH. 081, AT 9:00 AM (0H54M) ON DECEMBER 8 (THU.)
- REPORTING FROM □□, IN THE WORLD
  ON CH. 081, AT 8:00 AM (0H54M) ON MARCH 8 (THU.)

DIGEST SCREEN (DELETE SCREEN)

ENTER (72)
END (73)
CANCEL SELECTIONS

BACK  END

71

INFORMATION PROCESSING SYSTEM, RECORDING APPARATUS, PORTABLE DEVICE, INFORMATION PROCESSING METHOD, AND PROGRAM

CROSS-REFERENCE TO RELATED APPLICATIONS

The present application claims priority from Japanese Patent Application No. JP 2007-207933, filed in the Japanese Patent Office on Aug. 9, 2007, the entire content of which is incorporated herein by reference.

BACKGROUND OF THE INVENTION

1. Field of the Invention

The present invention relates to an information processing system, a recording apparatus, a portable device, an information processing method, and a program. More particularly, the invention relates to an information processing system, a recording apparatus, a portable device, an information processing method, and a program for enabling the operations performed on the portable device to be reflected easily on the contents recorded on the recording apparatus such as a hard disk recorder.

2. Description of the Related Art

There have been proposed techniques for transferring the contents recorded by the recorder such as a hard disk recorder or a DVD (Digital Versatile Disc) recorder to a portable device for away-from-home viewing. Such techniques are disclosed illustratively in Japanese Patent Laid-Open Nos. 2006-202475 and 2007-080366.

The deletion of and other operations on the contents recorded on the ordinary recorder are typically carried out by the user giving relevant instructions by operating a control panel or a remote controller of the recorder.

That means it is necessary for the user to stay close to the recorder when manipulating its control panel or remote controller in order to delete or otherwise operate on the recorded contents.

Meanwhile, the user staying away from the recorder may delete or otherwise operate on the contents recorded on the recorder illustratively by operating the apparatus by means of a network such as the Internet. For example, the user away from home may go on the network such as the Internet to operate the recorder remotely when deleting or otherwise operating on the recorded contents.

However, to operate the recorder by use of the network such as the Internet requires making complicated settings that would allow the user to connect to and handle the recorder via the network.

In order to delete any content from the recorder while staying away from home, the user on the road needs to know what kinds of contents have been recorded on the recorder.

One way for the user away from the recorder to know the contents recorded thereon involves having the contents transferred from the recorder to the portable device and carrying the apparatus with him or her while on the road, as mentioned above.

SUMMARY OF THE INVENTION

If the user away from home wants to delete any content from the recorder at home, complicated settings need to be made to connect to the recorder through the network as outlined above. In order to know the contents recorded on the recorder, the user needs to have the contents transferred from the recorder to the portable device carried around with him or her.

However, making the complicated settings for connecting to the recorder via the network is a tiresome exercise. While it is necessary for the user to know the contents recorded on the recorder before deleting or operating on any of the recorded contents, there is no need to transfer all contents from the recorder to the portable device.

The present invention has been made in view of the above circumstances and provides arrangements such that the operations performed on the portable device can be reflected easily on the contents recorded on the recorder.

In carrying out the present invention and according to one embodiment thereof, there is provided an information processing system including a recording apparatus for recording contents and a portable device suitable for being carried around, wherein the recording apparatus includes a recording control section configured to record contents to a recording medium, a selection section configured to select a content recorded on the recording medium as a target content to be transferred, and a creation section configured to create digest information summarizing the target content. The recording apparatus further includes a digest information transfer control section configured to transfer to the portable device a digest information set constituted by the digest information about the target content and by identification information identifying the target content, the digest information and the identification information being associated with each other. The recording apparatus still further includes an operation information reception control section configured to receive from the portable device an operation information set constituted by the identification information and by operation information about the operation performed on the portable device with regard to the digest information about the target content identified by the identification information, the identification information and the operation information being associated with each other. The recording apparatus still further includes an operation information reflection section configured to perform a process on the target content identified by the identification information in the operation information set, the process corresponding to the operation information associated with the identification information. The portable device includes a digest information reception control section configured to receive the digest information set from the recording apparatus, and an operation information transfer control section configured to transfer to the recording apparatus the operation information set constituted by the operation information about the operation performed with regard to the digest information in the digest information set and by the identification information corresponding to the digest information, the operation information and the identification information being associated with each other.

Where the information processing system of the present embodiment is in use, contents are first recorded by the recording apparatus on the recording medium. A content is then selected from the recording medium as a target content to be transferred. Digest information summarizing the target content is created. To the portable device, the recording apparatus transfers a digest information set constituted by the digest information about the target content and by identification information identifying the target content, the digest information and the identification information being associated with each other. From the portable device, the recording apparatus receives an operation information set constituted by the identification information and by operation information about the operation performed on the portable device with regard to the digest information about the target content identified by the identification information, the identification information and the operation information being associated with each other. The recording apparatus then performs a process on the target content identified by the identification information in the operation information set, the process corresponding to the operation information associated with the identification information. The portable device receives the digest information set from the recording apparatus. To the recording apparatus, the portable device transfers the operation information set constituted by the operation information about the operation performed with regard to the digest information in the digest information set and by the identification information corresponding to the digest information, the operation information and the identification information being associated with each other.

According to another embodiment of the present invention, there is provided a recording apparatus for recording contents, as well as a program run on a computer by the recording apparatus, the program causing the computer functionally to implement the recording apparatus includes a recording control section configured to record contents to a recording medium, a selection section configured to select a content recorded on the recording medium as a target content to be transferred, and a creation section configured to create digest information summarizing the target content. The program further includes a digest information transfer control section configured to transfer to a portable device a digest information set constituted by the digest information about the target content and by identification information identifying the target content, the digest information and the identification information being associated with each other. The program further includes an operation information reception control section configured to receive from the portable device an operation information set constituted by the identification information and by operation information about the operation performed on the portable device with regard to the digest information about the target content identified by the identification information, the identification information and the operation information being associated with each other, and an operation information reflection section configured to perform a process on the target content identified by the identification information in the operation information set, the process corresponding to the operation information associated with the identification information.

According to a further embodiment of the present invention, there is provided an information processing method for use with a recording apparatus for recording contents, the information processing method includes the steps of selecting a content recorded on a recording medium as a target content to be transferred, creating digest information summarizing the target content, and transferring to a portable device a digest information set constituted by the digest information about the target content and by identification information identifying the target content, the digest information and the identification information being associated with each other. The information processing method further includes the steps of receiving from the portable device an operation information set constituted by the identification information and by operation information about the operation performed on the portable device with regard to the digest information about the target content identified by the identification information, the identification information and the operation information being associated with each other, and performing a process on the target content identified by the identification information in the operation information set, the process corresponding to the operation information associated with the identification information.

Where the recording apparatus of the present embodiment or the inventive program or information processing method for use therewith is in use, contents are first recorded to a recording medium. A content recorded on the recording medium is then selected as a target content to be transferred. Digest information summarizing the target content is created. To a portable device, a digest information set is transferred which is constituted by the digest information about the target content and by identification information identifying the target content, the digest information and the identification information being associated with each other. From the portable device, an operation information set is received which is constituted by the identification information and by operation information about the operation performed on the portable device with regard to the digest information about the target content identified by the identification information, the identification information and the operation information being associated with each other. A process is then performed on the target content identified by the identification information in the operation information set, the process corresponding to the operation information associated with the identification information.

According to an even further embodiment of the present invention, there is provided a portable device suitable for being carried around, as well as a program run on a computer by the portable device, the program causing the computer functionally to implement the portable device includes a digest information reception control section configured to receive a digest information set from a recording apparatus for recording contents, the digest information set being constituted by digest information about a target content and by identification information identifying the target content, the digest information and the identification information being associated with each other. The program further includes an operation information transfer control section configured to transfer to the recording apparatus an operation information set constituted by operation information about the operation performed with regard to the digest information in the digest information set and by the identification information corresponding to the digest information, the operation information and the identification information being associated with each other.

According to a still further embodiment of the present invention, there is provided an information processing method for use with a portable device suitable for being carried around, the information processing method includes the steps of receiving a digest information set from a recording apparatus for recording contents, the digest information set being constituted by digest information about a target content and by identification information identifying the target content, the digest information and the identification information being associated with each other. The information processing method further includes the steps of and transferring to the recording apparatus an operation information set constituted by operation information about the operation performed with regard to the digest information in the digest information set and by the identification information corresponding to the digest information, the operation information and the identification information being associated with each other.

Where the portable device of the present embodiment or the inventive program or information processing method for use therewith is in use, a digest information set is first received from a recording apparatus for recording contents. The digest information set is constituted by digest information about a target content and by identification information identifying the target content, the digest information and the identification information being associated with each other. To the recording apparatus, an operation information set is transferred which is constituted by operation information about the operation performed with regard to the digest information in the digest information set and by the identification information corresponding to the digest information, the operation information and the identification information being associated with each other.

The programs according to the present embodiment may be transferred through transmission media or distributed recorded on program recording media.

The recording apparatus and portable device according to the present embodiment may be apparatuses independent of each another or may be internal blocks constituting a single piece of equipment.

Through the use of the information processing system of the embodiment, the recording apparatus of the embodiment or the inventive program or information processing method for use therewith, and the portable device of the embodiment or the inventive program or information processing method for use therewith, the operations performed on the portable device can be reflected easily on the contents recorded by the recording apparatus.

BRIEF DESCRIPTION OF THE DRAWINGS

Further objects and advantages of the present invention will become apparent upon a reading of the following description and appended drawings in which:

FIG. 7 is a schematic view showing a typical digest screen;

DETAILED DESCRIPTION OF THE PREFERRED EMBODIMENTS

Figure 1:
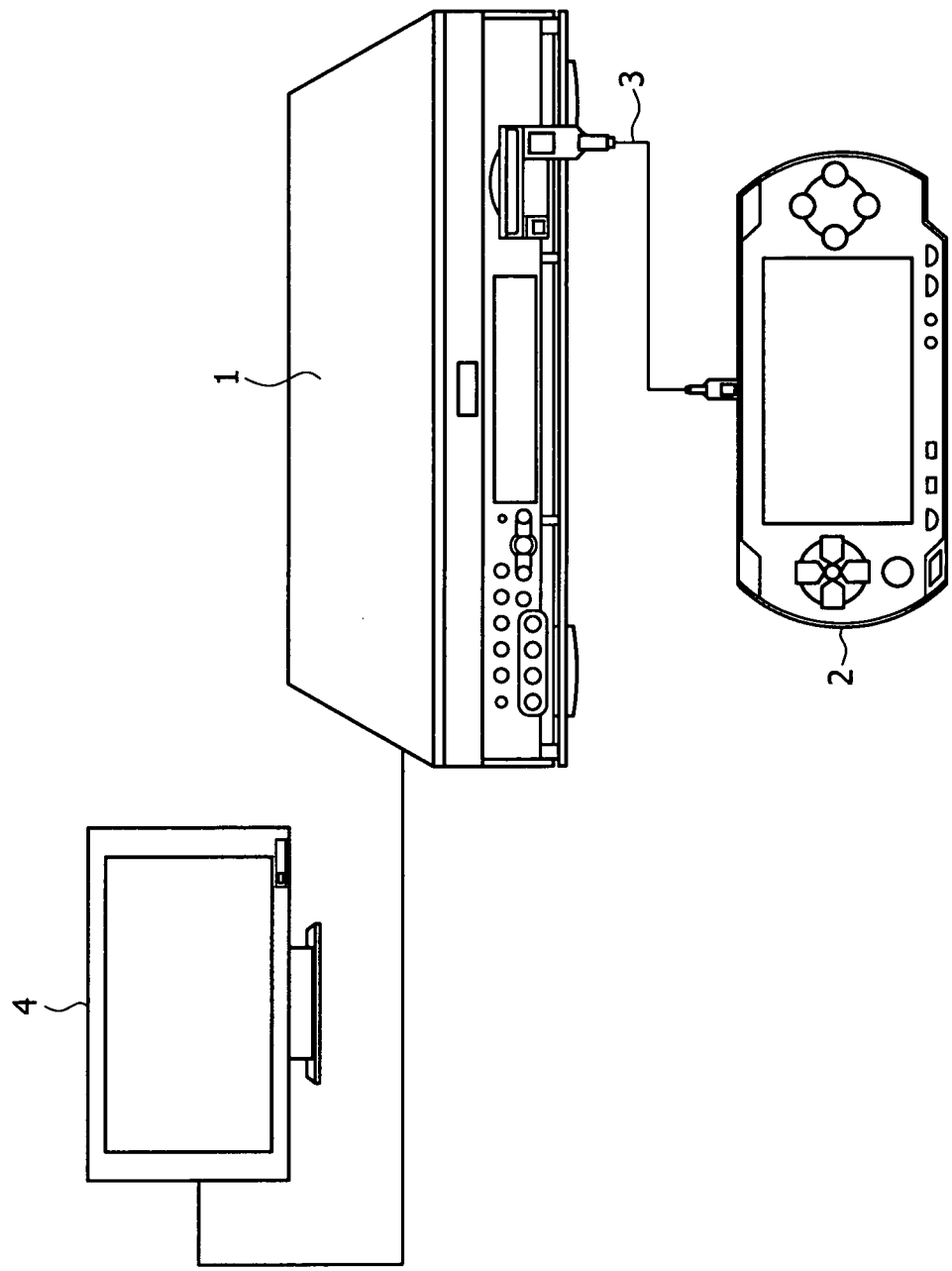
FIG. 1 is a schematic view showing a typical configuration of an information processing system according to one embodiment of the present invention.

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention depicted hereunder has a specifically corresponding claim, this does not mean that the example in question is limited to that claim or has no relevance to other claims.

One embodiment of the present invention is an information processing system including a recording apparatus (e.g., recorder 1 in FIG. 1) for recording contents and a portable device (e.g., portable device 2 in FIG. 1) suitable for being carried around; wherein the recording apparatus includes a recording control section (recording and reproduction control section 13 in FIG. 2) configured to record contents to a recording medium (e.g., hard disk drive 14 in FIG. 2), and a selection section (e.g., selection section 16 in FIG. 2) configured to select a content recorded on the recording medium as a target content to be transferred. The recording apparatus further includes a creation section (e.g., digest creation section 17 in FIG. 2) configured to create digest information summarizing the target content, and a digest information transfer control section (e.g., digest information transfer control section 18 in FIG. 2) configured to transfer to the portable device a digest information set constituted by the digest information about the target content and by identification information identifying the target content, the digest information and the identification information being associated with each other. The recording apparatus still further includes an operation information reception control section (e.g., operation information reception control section 19 in FIG. 2) configured to receive from the portable device an operation information set constituted by the identification information and by operation information about the operation performed on the portable device with regard to the digest information about the target content identified by the identification information, the identification information and the operation information being associated with each other. The recording apparatus still further includes an operation information reflection section (e.g., operation information reflection section 21 in FIG. 2) configured to perform a process on the target content identified by the identification information in the operation information set, the process corresponding to the operation information associated with the identification information. The portable device includes a digest information reception control section (e.g., digest information reception control section 41 in FIG. 3) configured to receive the digest information set from the recording apparatus. The portable device further includes an operation information transfer control section (e.g., operation information transfer control section 49 in FIG. 3) configured to transfer to the recording apparatus the operation information set constituted by the operation information about the operation performed with regard to the digest information in the digest information set and by the identification information corresponding to the digest information, the operation information and the identification information being associated with each other.

Another embodiment of the present invention is a recording apparatus for recording contents, as well as a program run on a computer by the recording apparatus, the program causing the computer functionally to implement the recording apparatus includes a recording control section (e.g., recording and reproduction control section 13 in FIG. 2) configured to record contents to a recording medium (e.g., hard disk drive 14 in FIG. 2), and a selection section (e.g., selection section 16 in FIG. 2) configured to select a content recorded on the recording medium as a target content to be transferred. The program further includes a creation section (e.g., digest creation section 17 in FIG. 2) configured to create digest information summarizing the target content, and a digest information transfer control section (e.g., digest information transfer control section 18 in FIG. 2) configured to transfer to a portable device a digest information set constituted by the digest information about the target content and by identification information identifying the target content, the digest information and the identification information being associated with each other. The program still further includes an operation information reception control section (e.g., operation information reception control section 19 in FIG. 2) configured to receive from the portable device an operation information set constituted by the identification information and by operation information about the operation performed on the portable device with regard to the digest information about the target content identified by the identification information, the identification information and the operation information being associated with each other. The program still further includes an operation information reflection section (e.g., operation information reflection section 21 in FIG. 2) configured to perform a process on the target content identified by the identification information in the operation information set, the process corresponding to the operation information associated with the identification information.

A further embodiment of the present invention is an information processing method for use with a recording apparatus for recording contents, the information processing method includes the steps of selecting (e.g., in step S13 of FIG. 5) a content recorded on a recording medium as a target content to be transferred, and creating (e.g., in step S15 of FIG. 5) digest information summarizing the target content. The information processing method further includes the steps of transferring (e.g., in step S16 of FIG. 5) to a portable device a digest information set constituted by the digest information about the target content and by identification information identifying the target content, the digest information and the identification information being associated with each other. The information processing method still further includes the steps of receiving (e.g., in step S51 of FIG. 10) from the portable device an operation information set constituted by the identification information and by operation information about the operation performed on the portable device with regard to the digest information about the target content identified by the identification information, the identification information and the operation information being associated with each other, and performing (in step S52 of FIG. 10) a process on the target content identified by the identification information in the operation information set, the process corresponding to the operation information associated with the identification information.

An even further embodiment of the present invention is a portable device suitable for being carried around, as well as a program run on a computer by the portable device, the program causing the computer functionally to implement the portable device includes a digest information reception control section (e.g., digest information reception control section 41 in FIG. 3) configured to receive a digest information set from a recording apparatus for recording contents, the digest information set being constituted by digest information about a target content and by identification information identifying the target content, the digest information and the identification information being associated with each other. The program further includes an operation information transfer control section (e.g., operation information transfer control section 49 in FIG. 3) configured to transfer to the recording apparatus an operation information set constituted by operation information about the operation performed with regard to the digest information in the digest information set and by the identification information corresponding to the digest information, the operation information and the identification information being associated with each other.

A still further embodiment of the present invention is an information processing method for use with a portable device suitable for being carried around, the information processing method includes the steps of receiving (e.g., in step S21 of FIG. 6) a digest information set from a recording apparatus for recording contents, the digest information set being constituted by digest information about a target content and by identification information identifying the target content, the digest information and the identification information being associated with each other. The information processing method further includes the steps of transferring (e.g., in step S42 of FIG. 9) to the recording apparatus an operation information set constituted by operation information about the operation performed with regard to the digest information in the digest information set and by the identification information corresponding to the digest information, the operation information and the identification information being associated with each other.

The preferred embodiments of the present invention will now be described in reference to the accompanying drawings.

FIG. 1 is a schematic view showing a typical configuration of an information processing system embodying the present invention (In this specification, the term "system" refers to a logical configuration of a plurality of component apparatuses. Each of the apparatuses may or may not be housed in a single enclosure.).

In FIG. 1, the information processing system is made up of a recorder 1, a portable device 2, and a TV set 4.

Using a hard disk drive 14 (FIG. 2; to be discussed later) as a recording medium, the recorder 1 records contents including broadcast programs such as those broadcast in digital format, programs typically distributed over the Internet such as movies, and moving and still images picked up by digital cameras.

The recorder 1 reproduces the contents recorded on the hard disk drive 14, and supplies the reproduced contents to the TV set 4.

In response to the user's operations, the recorder 1 selects a specific content found on the hard disk drive 14 as the target content to be transferred, and creates digest information summarizing the target content.

The recorder 1 may connect to the portable device 2 using illustratively a USB (Universal Serial Bus) cable 3. When connected with the portable device 2 through the USB cable 3, the recorder 1 transfers a target information set to the portable device 2. The target information set is constituted by the digest information about the target content and by a content ID (identification) identifying the target content, the digest information and the content ID being associated with each other.

When the recorder 1 is connected with the portable device 2 via the USB cable 3, the portable device 2 transfers an operation information set, to be discussed later, to the recorder 1. The recorder 1 receives the operation information set transferred from the portable device 2.

The operation information set is constituted by a content ID and by operation information about the operations performed on the portable device 2 with regard to the digest information about the content identified by the content ID, the operation information and the content ID being associated with each other. The recorder 1 performs a process on the content identified by the content ID in the operation information set, the process corresponding to the operation information associated with the content ID.

The portable device 2 is typically a mobile phone or a portable game console suitable for being carried around. When connected with the recorder 1 through the USB cable 3, the portable device 2 can exchange information with the recorder 1.

From the recorder 1, the portable device 2 receives the digest information set transferred through the USB cable 3. The portable device 2 presents the user with the digest information in the digest information set, acquires operation information about the user's operations performed on the digest information, and holds the operation information in an operation information set in association with the content ID in the digest information set. The portable device 2 then transfers the operation information set to the recorder 1 through the USB cable 3.

The TV set 4 displays the contents and other information supplied from the recorder 1.

Figure 2:
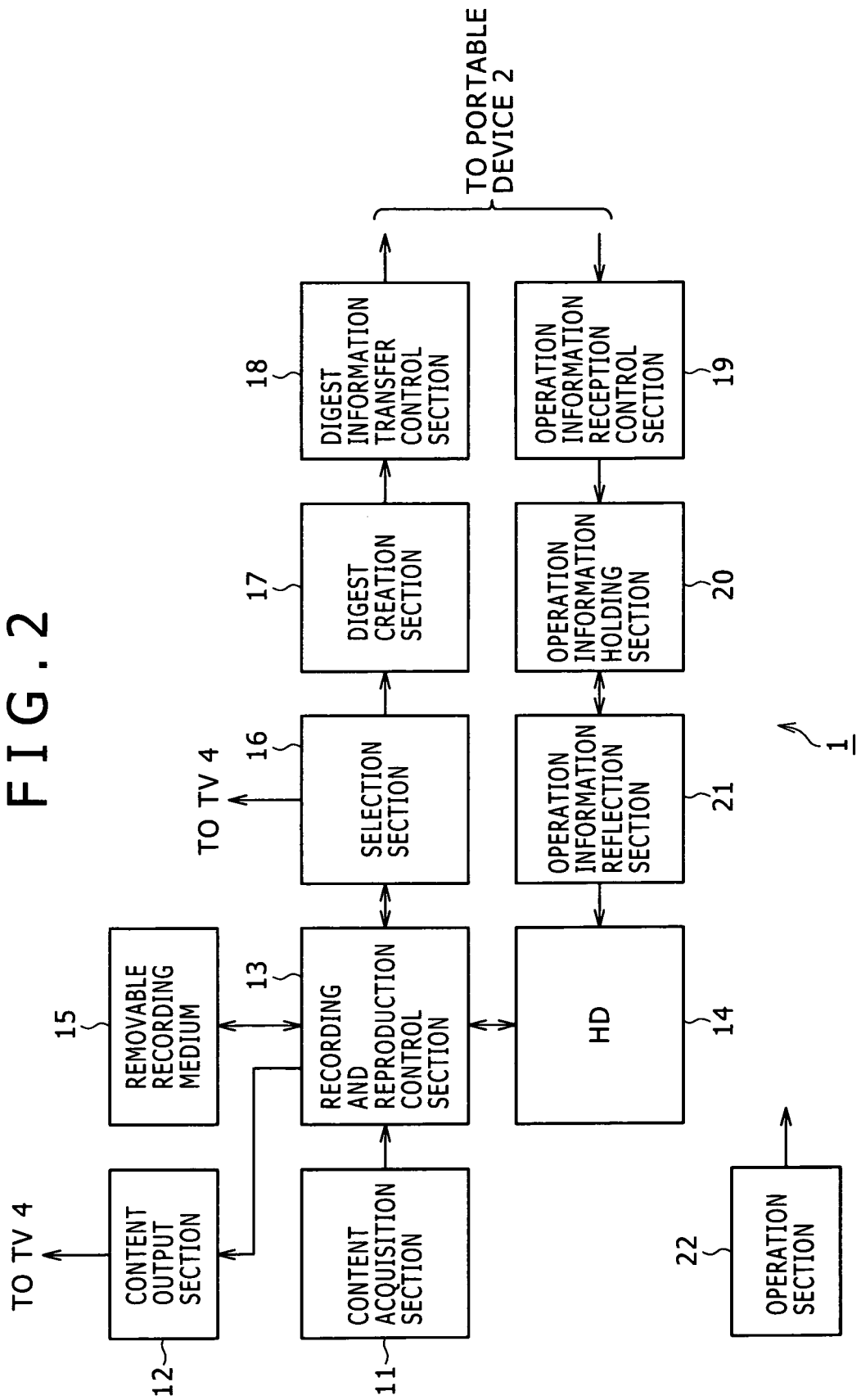
FIG. 2 is a block diagram showing a typical structure of a recorder.

In the information processing system configured as described above, the recorder 1 records contents to the hard disk drive 14 (FIG. 2).

The recorder 1 also reproduces contents from the hard disk drive 14 and supplies the reproduced contents to the TV 4.

Furthermore, with the recorder 1 connected to the portable device 2 via the USB cable 3, a digest information set is transferred from the recorder 1 to the portable device 2. From the portable device 2, an operation information set is transferred to the recorder 1.

The recorder 1 performs relevant processes using the operation information set coming from the portable device 2. The portable device 2 carries out its processes on the digest information set received from the recorder 1.

FIG. 2 is a block diagram showing a typical structure of the recorder 1.

In FIG. 2, a content acquisition section 11 serves as a tuner or an interface. Acting as a tuner, the content acquisition section 11 receives programs typically broadcast in digital format. As a communication interface, the content acquisition section 11 receives programs distributed illustratively over the Internet. Also acting as an interface, the content acquisition section 11 receives moving and still images supplied by digital cameras or the like. The contents thus acquired are forwarded from the content acquisition section 11 to a recording and reproduction control section 13.

A content output section 12 is supplied with contents from the recording and reproduction control section 13, the contents having been reproduced from the hard disk drive 14 or from a removable recording medium 15. The content output section 12 forwards the contents received from the recording and reproduction control section 13 to the TV set 4.

The recording and reproduction control section 13 controls recording of the contents coming from the content acquisition section 11. The recording and reproduction control section 13 further controls reproduction of the contents that are recorded on the hard disk drive 14 or on the removable recording medium 15.

More specifically, the recording and reproduction control section 13 receives contents from the content acquisition section 11 and records the received contents to the hard disk drive 14 or to the removable recording medium 15. The recording and reproduction control section 13 also reproduces contents from the hard disk drive 14 or removable recording medium 15 and feeds the reproduced contents to the content output section 12 and to a selection section 16.

The hard disk drive 14 has contents recorded thereto by the recording and reproduction control section 13.

The removable recording medium 15 is typically a disk-like recording medium such as a magneto-optical disk or a semiconductor memory that is attached removably to the recorder 1. Contents are recorded to the removable recording medium 15 by the recording and reproduction control section 13.

From the contents recorded on the hard disk drive 14, the selection section 16 selects a specific content (target content) to be transferred to the portable device 2.

More specifically, the selection section 16 creates a selection screen on which to select the target content from the contents recorded on the hard disk drive 14, and sends the selection screen thus created to the TV set 4 for display. The selection section 16 waits for the user to view the selection screen displayed on the TV set 4 and to operate an operation section 22 to select a desired content. After the user has selected the content of interest, the selection section 16 selects the user-selected content as the target content. The selection section 16 then requests the recording and reproduction control section 13 to supply the target content. In response to the request, the recording and reproduction control section 13 reproduces the target content from the hard disk drive 14 and feeds the reproduced (i.e., target) content to a digest creation section 17.

When recording a content illustratively to the hard disk drive 14, the recording and reproduction control section 13 furnishes the content with a content ID for identification purposes. The selection section 16 thus sends the target content together with its content ID to the digest creation section 17, the target content being supplied from the recording and reproduction control section 13.

The digest creation section 17 creates digest information summarizing the target content supplied from the selection section 16, and associates the created digest information with the content ID of the target content. Furthermore, the digest information section 17 supplies the digest information and the content ID associated therewith to a digest information transfer control section 18, the digest information and the content ID constituting a digest information set.

The digest information transfer control section 18 controls transfer of the digest information set from the digest creation section 17 to the portable device 2. Specifically, when the recorder 1 is connected to the portable device 2 using the USB cable 3, the digest information transfer control section 18 transfers the digest information set from the digest creation section 17 to the portable device 2 by way of the USB cable 3.

An operation information reception control section 19 controls reception of the operation information set transferred from the portable device 2 over the USB cable 3. Specifically, when the recorder 1 is connected to the portable device 2 using the USB cable 3, the operation information reception control section 19 receives the operation information set transferred from the portable device 2 through the USB cable, and supplies the received operation information set to an operation information holding section 20.

The operation information holding section 20 temporarily holds the operation information set received from the operation information reception control section 19.

An operation information reflection section 21 reads the operation information set being held by the operation information holding section 20 and, based on the retrieved operation information set, performs a specific process on the content recorded on the hard disk drive 14.

In the operation information set, as described above, the content ID is associated with the operation information about the operations performed on the portable device 2 with regard to the digest information about the content identified by that content ID. The operation information reflection section 21 performs a process on a particular content among the contents recorded on the hard disk drive 14, the particular content being identified by the content ID in the operation information set retrieved from the operation information holding section 20, the process corresponding to the operation information associated with the content ID in question.

The operation section 22 is typically constituted by a control panel furnished on the enclosure of the recorder 1 or by a remote commander for remotely controlling the recorder 1. When operated by the user, the operation section 22 generates an operation signal representative of the user's operation and supplies the signal to relevant blocks making up the recorder 1.

Figure 3:
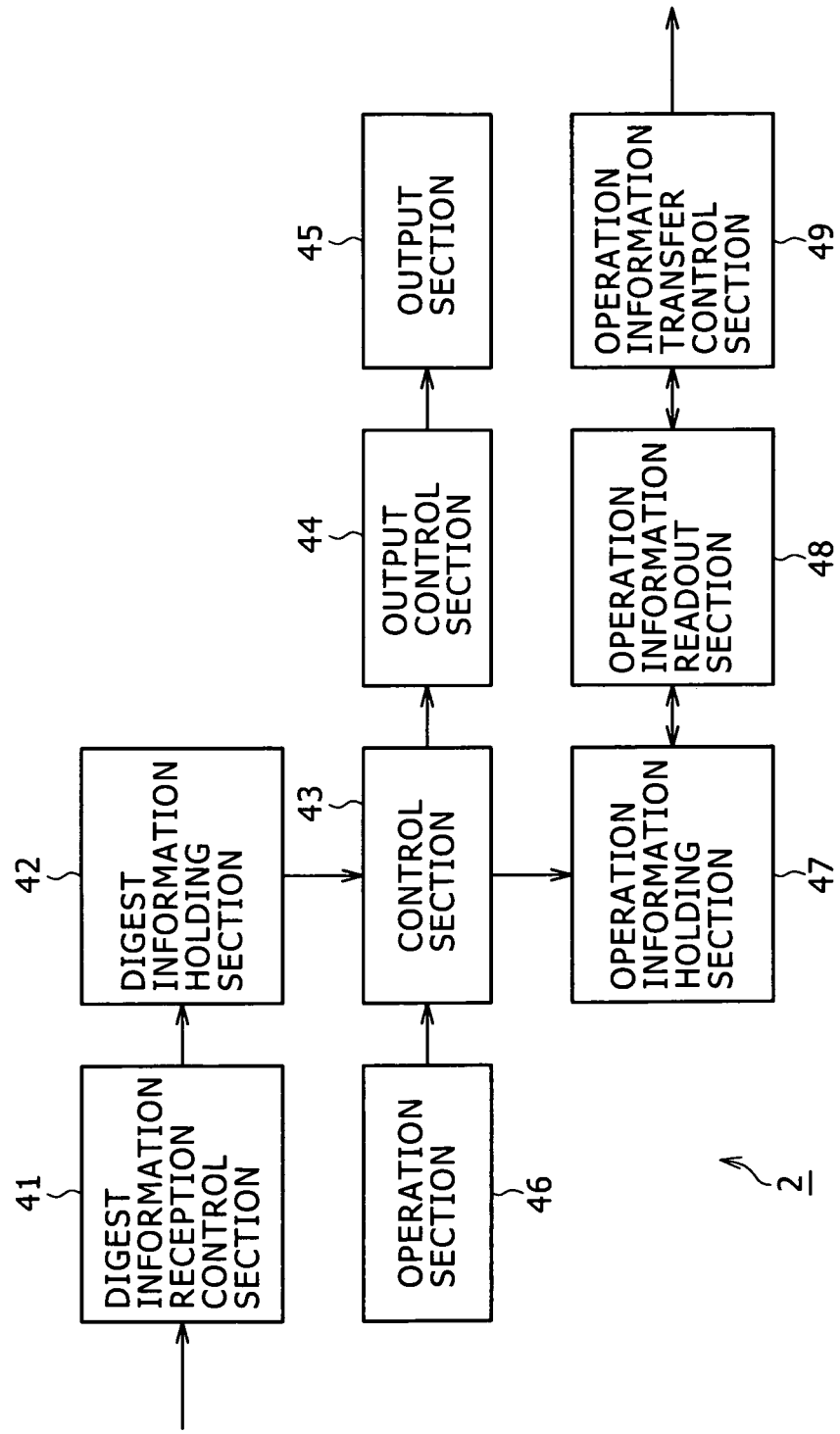
FIG. 3 is a block diagram showing a typical structure of a portable device.

FIG. 3 is a block diagram showing a typical structure of the portable device 2.

A digest information reception control section 41 controls reception of the digest information set transferred from the recorder 1 over the USB cable 3. Specifically, when the recorder 1 is connected to the portable device 2 using the USB cable 3, the digest information reception control section 41 receives the digest information set transferred over the USB cable 3 from the digest information transfer control section 18 in the recorder 1 (FIG. 2). The digest information set thus received is forwarded to a digest information holding section 42.

The digest information holding section 42 temporarily holds the digest information set supplied from the digest information reception control section 41.

A control section 43 reads the digest information set from the digest information holding section 42 and supplies an output control section 44 with the digest information from the retrieved digest information set.

The control section 43 is fed with operation signals from an operation section 46.

Based on the operation signal given by the operation section 46, with digest information being output from an output section 45 (to be discussed later), the control section 43 creates operation information about the operation performed by the operation section 46 on the digest information in question. Furthermore, the control section 43 associates the operation information with the content ID associated with the digest information operated on by the operation section 46, thus creating an operation information set. The operation information set thus prepared is supplied to an operation information holding section 47.

The output control section 44 controls output of the digest information supplied by the control section 43. More specifically, if the digest information from the control section 43 contains information that can be displayed, then the output control section 44 causes the output section 45 to display that information in image form. If the digest information from the control section 43 contains information that can be output audibly, the output control section 44 causes the output section 45 to output that information as a sound.

The output section 45 is illustratively made up of a display unit and speakers. As such, the output section 45 displays images and outputs sounds under control of the output control section 44.

The operation section 46 is operated by the user. When the user operates the operation section 46, the operation section 46 generates an operation signal corresponding to the user's operation and supplies the signal to the control section 43.

The operation information holding section 47 temporarily holds the operation information set supplied from the control section 43.

An operation information readout section 48 reads the operation information set that is stored (i.e., held) by the operation information holding section 47, and sends the retrieved operation information set to an operation information transfer control section 49.

The operation information transfer control section 49 controls transfer of the operation information set from the operation information readout section 48 to the recorder 1. Specifically, when the recorder 1 is connected to the portable device 2 using the USB cable 3, the operation information transfer control section 49 transfers the operation information set from the operation information readout section 48 to the operation information reception control section 19 in the recorder 1 (FIG. 2) by way of the USB cable 3.

Where the recorder 1 and portable device 2 are structured as described above, the recorder 1 is connected to the portable device 2 typically using the USB cable 3. When the user operates the operation section 22 to display the selection screen on which to select the target content from among the contents recorded on the hard disk drive 14 (FIG. 2), the recorder 1 carries out a digest information transfer process whereby a digest information set is transferred to the portable device 2 through the USB cable 3.

In the digest information transfer process, the selection section 16 of the recorder 1 (FIG. 2) creates the selection screen and feeds it to the TV set 4 for display.

Figure 4:
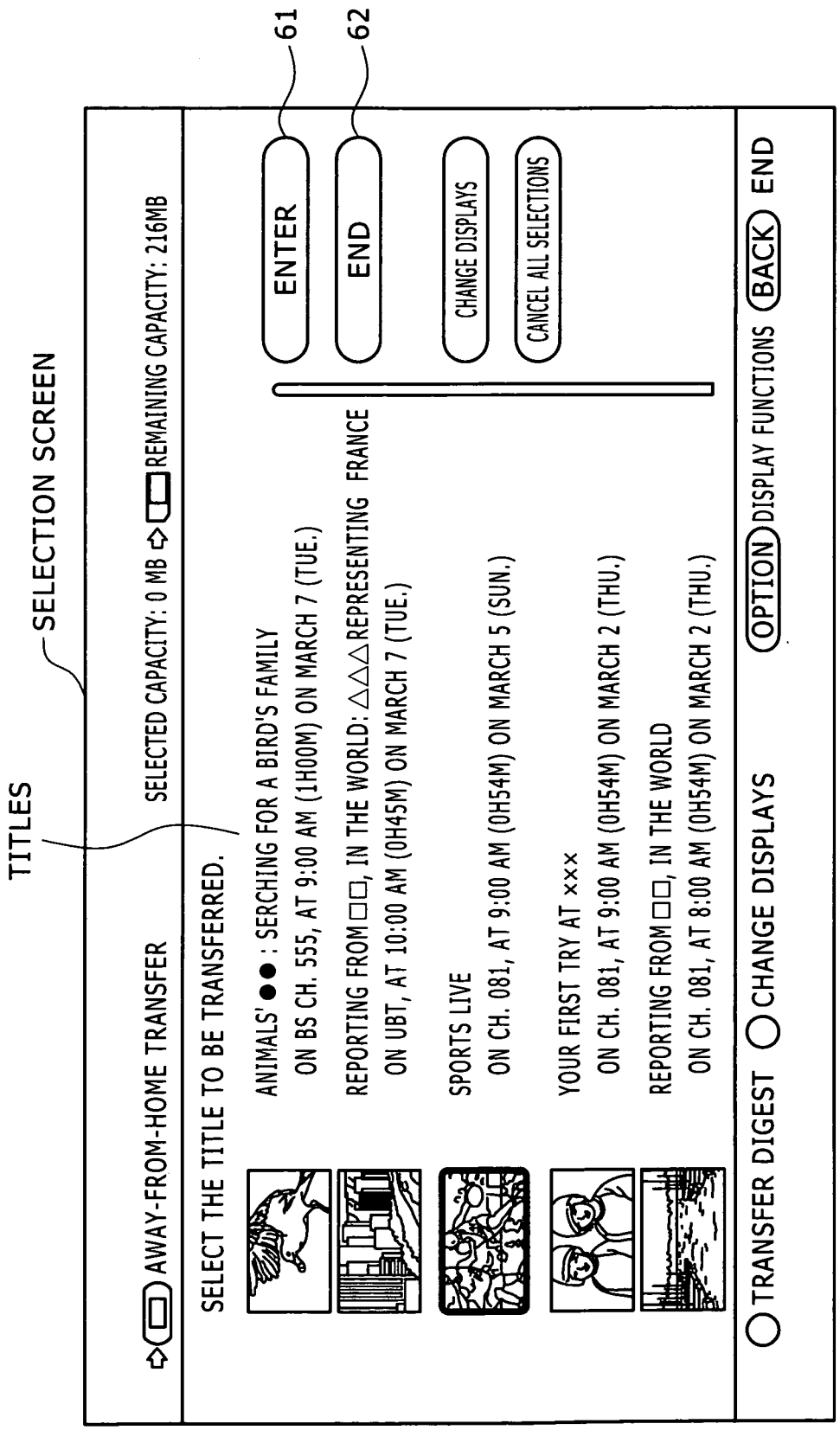
FIG. 4 is a schematic view showing a typical selection screen.

FIG. 4 schematically shows a typical selection screen.

The selection section 16 requests a list of the titles of the contents recorded on the hard disk drive 14 from the recording and reproduction control section 13. The selection section 16 proceeds to create a selection screen that contains the list of such content titles (which may also be called the content list hereunder).

On the selection screen, the user may select any of the titles in the content list by clicking on it using the operation section 22. The content whose title is clicked on is selected as the target content.

In addition to the content list, the selection screen includes an enter key 61 and an end key 62.

When the user clicks on the enter button 61 by operating the operation section 22, the selection of the target content is finalized. The end key 62, when clicked on by the user operating the operating section 22, closes the selection screen (i.e., the selection screen displayed on the TV set 4 disappears).

Figure 5:
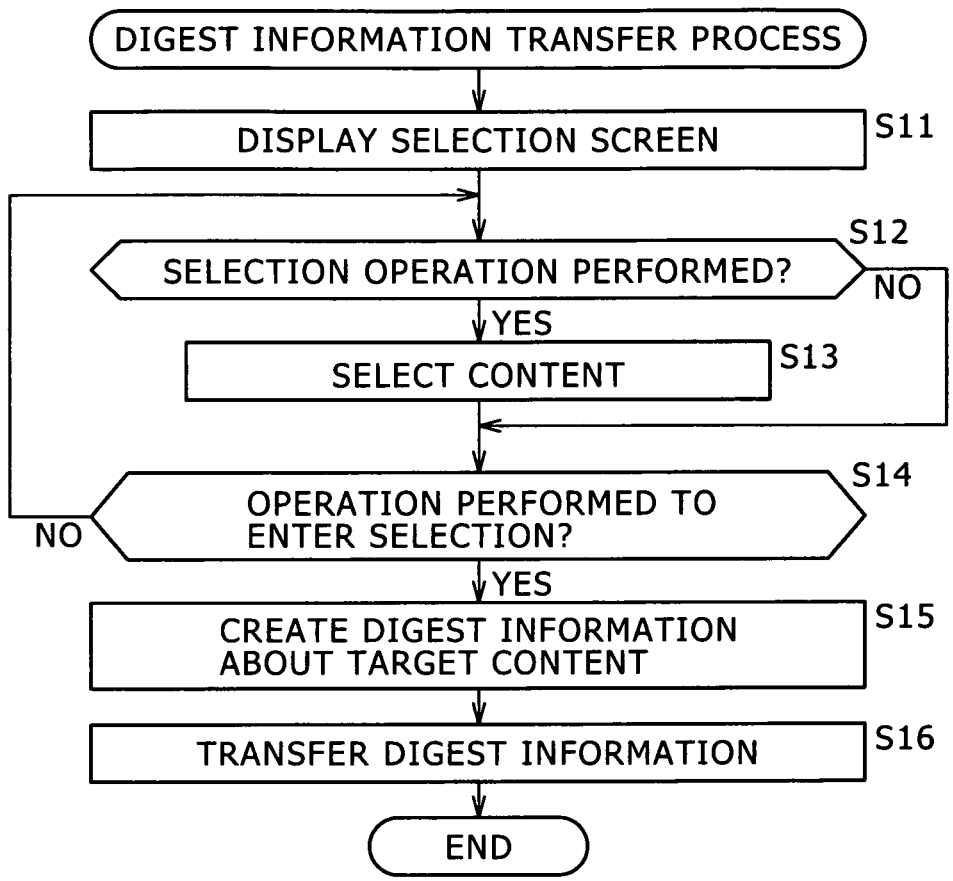
FIG. 5 is a flowchart of steps constituting a digest information transfer process.

Described below in reference to the flowchart of FIG. 5 is the digest information transfer process carried out by the recorder 1 (FIG. 2).

In step S11 of this process, the selection section 16 creates the above-described selection screen (FIG. 4) and supplies the created screen to the TV set 4 for display.

Step S11 is followed by step S12. In step S12, the selection section 16 checks to determine whether the user has operated the operation section 22 to select a particular title in the content list on the selection screen (the operation is called the selecting operation).

If in step S12 the selecting operation is found to be performed, i.e., if the user is found to have clicked on one of the titles in the content list on the selection screen, then control is passed on to step S13. In step S13, the selection section 16 selects as the target content the content whose title has been clicked on by the user. Step S13 is followed by step S14.

If in step S12 the selecting operation is not found to have been carried out, then step S13 is skipped and step S14 is reached. In step S14, the selection section 16 checks to determine whether the user has clicked on the enter button 61 on the selection screen (FIG. 4) by operating the operation section 22.

If in step S14 the enter button 61 is not found to be clicked on, then step S12 is reached again. The subsequent steps are then repeated.

If the enter button 61 is found clicked on in step S14, then the selection section 16 finalizes the selection, as the target content, of the content whose title has been clicked on by the user. The selection section 16 proceeds to request the target content from the recording and reproduction control section 13. The selection section 16 then waits for the recording and reproduction control section 13 to reproduce (i.e., read) the target content from the hard disk drive 14 and to feed the reproduced content to this section 16. With the target content supplied to the selection section 16, control is passe from step S14 to step S15.

In step S15, the digest creation section 17 creates digest information summarizing the target content supplied from the selection section 16, and associates the created digest information with the content ID of the target content. The digest creation section 17 proceeds to feed the digest information transfer control section 18 with a digest information set constituted by the digest information and the content ID associated therewith. Step S15 is followed by step S16.

Illustratively, the digest information about the target title may be formed by its title.

In step S16, the digest information transfer control section 18 transfers the digest information set from the digest creation section 17 to the portable device 2 through the USB cable 3. This step terminates the digest information transfer process. The digest information transfer process may also be brought to an end when the end button 62 is operated on the selection screen (FIG. 4).

While the digest information transfer process in FIG. 5 is being performed by the recorder 1, the portable device 2 connected to the recorder 1 via the USB cable 3 concurrently carries out a digest information reception process for receiving the digest information set transferred from the recorder 1.

Figure 6:
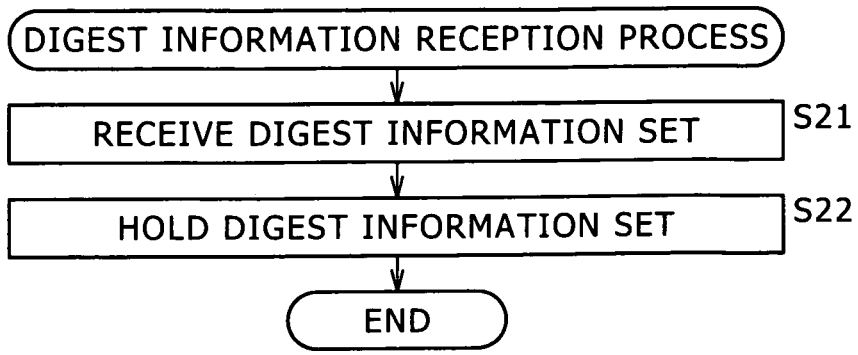
FIG. 6 is a flowchart of steps constituting a digest information reception process.

Described below in reference to the flowchart of FIG. 6 is the digest information reception process performed by the portable device 2 (FIG. 3).

In this process, the portable device 2 waits for the digest information set to be transferred from the recorder 1. In step S21, the digest information reception control section 41 receives the digest information set coming from the recorder 1 (i.e., from its digest information transfer control section 18). Also in step S21, the digest information reception control section 41 supplies the received digest information set to the digest information holding section 42. Thereafter, step S21 is followed by step S22.

In step S22, the digest information holding section 42 holds (i.e., stores) the digest information set forwarded from the digest information reception control section 41. This step terminates the digest information reception process.

After the digest information set is held by the digest information holding section 42 of the portable device 2 as described above, the user may remove the USB cable 3 from the portable device 2 and leave home carrying the portable device 2 with him or her. By operating the portable device 2 while on the road, the user may perform a specific process on the digest information about the target content and even on the content itself.

Illustratively, if the user operates the operation section 46 of the portable device 2 (FIG. 3) brought away from home, in such a manner as to get the digest information displayed, then the portable device 2 performs an operation information acquisition process for acquiring operation information about the operation performed by the user on the digest information.

In the operation information acquisition process, the portable device 2 presents the user with the digest information as part of the digest information set held by the digest information holding section 42 during the digest information reception process of FIG. 6. The portable device 2 thus allows the user to view the digest information.

For example, where content titles are used as digest information as mentioned above, the portable device 2 creates the digest screen on which to display the digest information in the form of a screen that includes a list of the titles constituting the digest information (i.e., content list).

Alternatively, the digest screen may also be created in the form of a delete screen that permits deletion of the contents whose titles are included in the content list being displayed.

FIG. 7 schematically shows the delete screen that serves as a typical digest screen.

The delete screen displays a content list, i.e., a list of the titles making up the digest information as part of the digest information set held by the digest information holding section 42.

A check box 71 is displayed on the left of each title in the content list on the delete screen. Clicking on a given check box 71 causes a check mark to appear in that box. Every time the check box 71 is clicked on, the check mark appears or disappears alternately.

When the delete screen is being displayed, the user may operate the operation section 46 to delete specific contents. Illustratively, an instruction to delete a particular content may be given by clicking a check mark into the check box 71 on the left of the title of the content in question.

In addition to the content list, the delete screen acting as the digest screen includes a enter button 72 and an end button 73. Clicking on the enter button 72 finalizes the deletion of the content whose title is given a check mark in the check box 71 on the left. The delete screen as the digest screen is closed by clicking on the end button 73.

Figure 8:
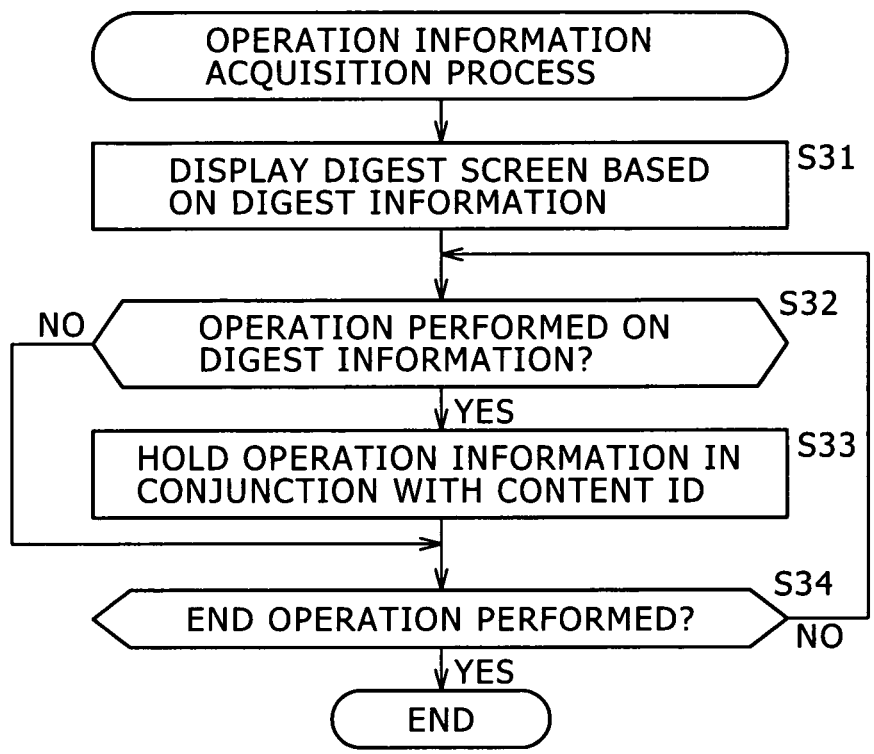
FIG. 8 is a flowchart of steps constituting an operation information acquisition process.

Described below in reference to the flowchart of FIG. 8 is the operation information acquisition process carried out by the portable device 2 (FIG. 3).

In step S31 of this process, the output section 45 is caused to display the digest screen based on the digest information as part of the digest information set held by the digest information holding section 42.

More specifically, the control section 43 in step S31 retrieves the digest information set from the digest information holding section 42 and creates the content list as a list of the titles making up the digest information in the digest information set. The control section 43 proceeds to create a digest screen containing that content list (e.g., delete screen in FIG. 7) and to supply the created screen to the output control section 44. In turn, the output control section 44 causes the output section 45 to display the delete screen which serves as the digest screen and which is sent from the control section 43. From step S31, control is passed on to step S32.

In step S32, the control section 43 checks to determine whether any operation is made by the user on a particular title in the content list as the digest information on the digest screen.

In step S32, an operation may be found to have been performed on the digest information over the digest screen. Illustratively, the operation section 46 may have been operated to delete the content corresponding to a particular title in the content list on the delete screen given as the digest screen, and the operation signal corresponding to the operation is supplied to the control section 43 from the operation section 46. On the delete screen of FIG. 7, for example, a check mark may be clicked into the check box 71 on the left of at least one title, and the enter button 72 may be clicked on to finalize the deletion of the content of that title. In such a case, control is passed from step S32 to step S33. In step S33, the control section 43 supplies the operation information set to the operation information holding section 47 and causes that section 47 to hold the set.

More specifically, the control section 43 in step S33 creates operation information representing an instruction to delete the designated content on the basis of an operation signal supplied by the operation section 46. The operation signal is created by the operation section 46 when that section 46 is operated by the user to designate deletion of the content in question.

The control section 43 proceeds to create an operation information set associating the operation information created based on the operation signal from the operation section 46, with the content ID corresponding to the digest information which is part of the digest information set and which constitutes the title of the content designated to be deleted. The control section 43 then supplies the created operation information set to the operation information holding section 47 for storage (i.e., to be held therein). From step S33, control is passed on to step S34.

Illustratively, if the operation section 46 of the portable device 2 is operated to designate deletion of a content as described above, then the digest information set containing the title of the content designated to be deleted may be either deleted from the digest information holding section 42 or kept intact therein.

In step S34, the control section 43 checks to determine if an ending operation is performed, e.g., whether the user has operated the operation section 46 to click on the end button 73 on the delete screen (FIG. 7) serving as the digest screen.

If in step S34 the ending operation is not found to be carried out, control is returned to step S32. The subsequent steps are then repeated.

If in step S34 the ending operation is found to be performed, i.e., if the user is found to have operated the operation section 46 to click on the end button 73 on the delete screen, then an operation signal representing the user's operation is sent from the operation section 46 to the control section 43. This terminates the operation information acquisition process.

After the operation information acquisition process of FIG. 8 is executed by the portable device 2 as described above and the operation information set is placed in the operation information holding section 47, the user may come home and connect the portable device 2 to the recorder 1 using the USB cable (FIG. 1). In such a case, the portable device 2 carries out an operation information transfer process for transferring the operation information set to the recorder 1 through the USB cable 3.

In step S41 of the operation information transfer process, the operation information readout section 48 (FIG. 3) reads one operation information set (made up of a content ID and operation information) from the operation information holding section 47. The retrieved operation information set is fed to the operation information transfer control section 49, and control is passed on to step S42.

In step S42, the operation information transfer control section 49 transfers the operation information set from the operation information readout section 48 to the recorder 1 through the USB cable 3. When the operation information set is normally transferred to the recorder 1, the operation information transfer control section 49 instructs the operation information readout section 48 to delete the operation information set in question. Given the instruction from the operation information transfer control section 49, the operation information readout section 48 deletes the operation information set from the operation information holding section 47 accordingly. In this manner, the operation information set normally transferred to the recorder 1 is erased from among the operation information sets being held by the operation information holding section 47.

Step S42 is followed by step S43. In step S43, the operation information readout section 48 checks to determine whether the operation information holding section 47 holds any operation information set yet to be transferred.

If in step S43 the operation information holding section 47 is found to hold an operation information set yet to be transferred, then control is returned to step S41 and the subsequent steps are repeated.

If in step S43 the operation information holding section 47 is found to have no more operation information set to be transferred, then the operation information transfer process is brought to an end.

Figure 9:
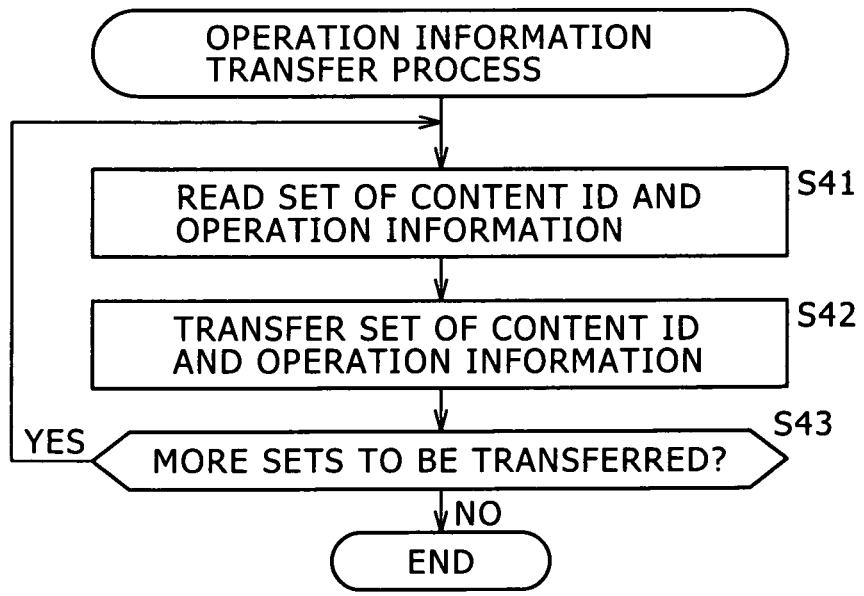
FIG. 9 is a flowchart of steps constituting an operation information transfer process.

While the operation information transfer process of FIG. 9 is being carried out by the portable device 2, the recorder 1 connected to the portable device 2 through the USB cable 3 concurrently performs an operation reflection process. This process involves receiving the operation information set transferred from the apparatus 2 and causing the process corresponding to the operation information in the operation information set to be reflected on the contents recorded on the hard disk drive 14.

Figure 10:
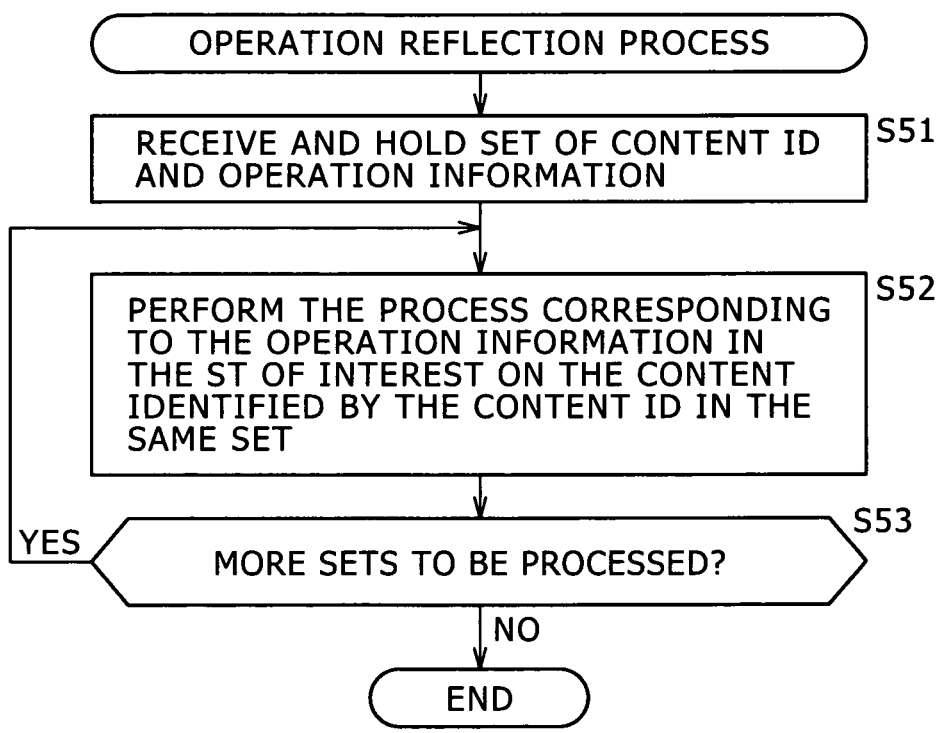
FIG. 10 is a flowchart of steps constituting an operation reflection process.

Described below in reference to the flowchart of FIG. 10 is the operation reflection process carried out by the recorder 1 (FIG. 2).

When this process is initiated, the recorder 1 waits for an operation information set to be transferred from the portable device 2. In step S51, the operation information reception control section 19 (FIG. 2) receives the operation information set from the portable device 2 (i.e., from its operation information transfer control section 49). Also in step S51, the operation information reception control section 19 supplies the received operation information set to the operation information holding section 20 so that the set may be held by the latter.

After the operation information reception control section 19 has received all operation information sets from the portable device 2 and the operation information holding section 20 has held all the received sets, control is passed on to step S52. In step S52, the operation information reflection section 21 reads one of the operation information sets held by the operation information holding section 20 as the set of interest. From among the contents recorded on the hard disk drive 14, the operation information reflection section 21 selects the content identified by the content ID in the set of interest and performs on the selected content the process corresponding to the operation information in the set of interest.

More specifically, if the operation information in the set of interest designates deletion of a content as described above, then the operation information reflection section 21 deletes from the hard disk drive 14 the content identified by the content ID in the set of interest. In this manner, the operation performed by the user on the portable device 2 is reflected on the contents kept by the recorder 1.

After performing the process corresponding to the operation information in the set of interest, the operation information reflection section 21 deletes the set of interest from the operation information holding section 21. Control is then transferred from step S52 to step S53. That is, the operation information set on which the process corresponding to the operation information was performed is erased from the operation information holding section 20.

In step S53, the operation information reflection section 21 checks to determine whether the operation information holding section 20 holds any more operation information set to be read as the set of interest.

If in step S53 the operation information holding section 20 is found to hold any operation information set yet to be read as the set of interest, then control is returned to step S51. In step S51, one of the operation information sets held by the operation information holding section 20 is again read as the new set of interest, and the subsequent steps are repeated.

If in step S53 the operation information holding section 20 is found to hold no more operation information set to be read as the set of interest, then the operation reflection process is terminated.

As described above, the recorder 1 selects some of the contents recorded on the hard disk drive 14 as target contents, and creates digest information summarizing the selected target contents. The recorder 1 also transfers to the portable device 2 digest information sets each associating the digest information about each target content with its content ID.

The portable device 2 receives the digest information sets from the recorder 1. The portable device 2 then transfers to the recorder 1 the operation information sets each associating the operation information about the user's operation on the digest information in a given digest information set, with the content ID corresponding to the digest information in question.

When the recorder 1 receives an operation information set from the portable device 2, the recorder 1 selects the content identified by the content ID in the received operation information set and performs on the selected content the process corresponding to the operation information associated with the content ID in question.

The operation performed through the portable device 2 on a given content kept in the recorder 1 is reflected easily on that content. There is no need for the user to make complicated settings necessary for controlling the recorder 1 illustratively over networks such as the Internet. Simply operating the portable device 2 makes it possible to operate the recorder 1.

The recorder 1 transfers to the portable device 2 not the contents themselves recorded on the hard disk drive 14 but digest information summarizing these contents (together with their content ID's). Such transfer takes substantially less time than would be required if the contents were transferred from the hard disk drive 14 to the portable device 2.

Where the digest information that summarizes contents (along with their content ID's) is transferred from the recorder 1 to the portable device 2, the portable device 2 may utilize a recording (storage) medium of an appreciably small capacity as the digest information holding section 42 to hold the digest information. That recording medium would need to be substantially large in capacity if the contents themselves were transferred from the hard disk drive 14.

With the above-described embodiment of the invention, the digest information about target contents was shown to be constituted by their titles. However, the digest information about target contents is not limited to their titles.

Alternatively, a leading part of each target content may be adopted as the digest information about the target contents. For example, the data of a predetermined amount or of a predetermined reproduction time from the beginning of each target content may be utilized as the digest information.

If target contents include image data, then it is possible to detect a key frame from each target content and adopt the image data of that key frame as the digest information about the target content in question. Illustratively, the key frame may be the first frame following a scene change or one of the frames with motion vectors that exceed a predetermined quantity.

Where target contents include image data, it is also possible to create thumbnails of the key frames or of the frames at intervals of a predetermined frame count. These thumbnails (or their groups) may be utilized as the digest information about the target contents.

If target contents are programs that are broadcast over the ground or delivered on the Internet (i.e., distributed programs) and if it is possible to acquire text data making up program information about the target contents, such as summaries and cast members of the distributed programs, then the text data may be adopted as the digest information about these target contents. Such program information may be acquired illustratively from EPG (Electronic Program Guide) offerings. In addition to the program information, the text data about the target contents may be constituted typically by the dates and times at which the target contents were recorded.

If target contents include both image data and audio data, then the audio data alone may be utilized as the digest information about the target contents.

Alternatively, the digest information about target contents may be constituted by a plurality of types of information about the contents such as both audio data and thumbnails.

If target contents make up dramas or the like including commercials, then these commercials may be utilized as the digest information about the target contents.

If target contents constitute a serial TV drama or other serial programs and if each episode of such programs includes a trailer of the next episode, then these trailers may be used as the digest information about the target contents.

Meanwhile, the techniques disclosed in Japanese Patent Laid-Open No. 2006-54619 may be adopted as typical ways to acquire digest information about contents.

From the recorder 1, it is possible to transfer to the portable device 2 the digest information about target contents as well as the target content themselves in reduced quantities. More specifically, instead of sending digest information, the recorder 1 may compress the target contents recorded on the hard disk drive 14 into sizes smaller than the originals (e.g., target contents may be compressed in a low bit rate mode or according to high compression rate standards such as MPEG-4 (Moving Picture Experts Group Phase 4), AVC (Advanced Video Coding)), and may transfer the compressed contents to the portable device 2.

With the above-described embodiment of the invention, the recorder 1 and the portable device 2 were shown connected using the USB cable 3 to permit exchanges of information such as digest information sets and operation information sets. Alternatively, instead of relying on the wired communication arrangements involving the USB cable 3 or the like, the recorder 1 and the portable device 2 may adopt a wireless communication scheme based on such standards as IEEE (Institute of Electrical and Electronics Engineers) 802.11 for the exchange of information therebetween.

Information can also be exchanged between the recorder 1 and the portable device 2 by means of the removable recording medium such as a memory card. Where the removable recording medium can be attached removably to both the recorder 1 and the portable device 2, the recording medium may be first connected to the recorder 1 to acquire information therefrom. The recording medium is then removed from the recorder 1 and attached to the portable device 2 for the transfer of the recorded information from the recorder 1 to the portable device 2. In like manner, the removable recording medium may be used to transfer information from the portable device 2 to the recorder 1.

With the above-described embodiment of the invention, the user was described as operating the operation section 46 of the portable device 2 to give the instruction to delete a specific content. Alternatively, the operation section 46 of the portable device 2 may be operated in such a manner as to give instructions to record contents to another removable recording medium 15 (FIG. 2) in what is called dubbing or archiving.

More specifically, the user may operate the operation section 46 to give instructions on the digest screen (FIG. 7) to select the digest information about the content desired to be dubbed and to execute the dubbing of the content in question. In that case, the portable device 2 creates an operation information set that associates the content ID corresponding to the digest information selected on the digest screen (i.e., content ID of the content desired to be dubbed), with operation information representing the instruction to dub the content. The operation information set is transferred from the portable device 2 to the recorder 1. Given the operation information from the portable device 2, the recorder 1 (FIG. 2) reproduces the content identified by the content ID in the operation information set from the hard disk drive 14 and records (i.e., dubs) the reproduced content to the removable recording medium 15.

The operation section 46 of the portable device 2 may also be operated to give instructions to reserve a particular TV program as the content to be subsequently recorded unattended.

More specifically, the user may operate the operation section 46 to give instructions on the digest screen to select the digest information about the content (TV program) desired to be recorded and to reserve that content for subsequent unattended recording. In this case, the portable device 2 creates an operation information set that associates the content ID corresponding to the digest information selected on the digest screen (i.e., content ID of the content desired to be recorded unattended), with operation information representing the instruction to reserve that content for subsequent unattended recording. The operation information set is transferred from the portable device 2 to the recorder 1. Based on the operation information set received from the portable device 2, the recorder 1 recognizes from EPG and other sources the number of the channel on which the content identified by the content ID in the operation information set is to be delivered, as well as the date and time at which the content is to be distributed. Using the information thus recognized, the recorder 1 proceeds to preset the content in question for unattended recording. With the recorder 1, two types of recording reservation are available: next-time reservation whereby only a specific program to be delivered next time is reserved for recording, and series reservation whereby a particular program delivered periodically (e.g., daily, weekly, etc.) is reserved for recording. One of the two types of recording reservation may be designated by operating the operation section 46, and the designated reservation type may be included in the operation information.

The operation section 46 of the portable device 2 may also be operated to give instructions to protect a certain content against inadvertent deletion.

Illustratively, the user may operate the operation section 46 to give instructions on the digest screen to select the digest information about the content desired to be protected and to make settings for protecting that content against erasure. In such a case, the portable device 2 creates an operation information set that associates the content ID corresponding to the digest information selected on the digest screen (i.e., content ID of the content desired to be protected), with operation information representing the instruction to protect the content in question. The operation information set is transferred from the portable device 2 to the recorder 1. Given the operation information set from the portable device 2, the recorder 1 protects the content identified by the content ID in the operation information set against deletion.

With the above-described embodiment of the invention, the digest information (as part of the digest information set) about the content whose title was selected by the user was shown to be transferred from the recorder 1 to the portable device 2. Alternatively, it is possible to transfer digest information from the recorder 1 to the portable device 2 regardless of such user-initiated selections.

Illustratively, the recorder 1 may transfer to the portable device 2 the digest information about the contents recorded anew on the hard disk drive 14 since the most recent transfer of digest information. It is also possible to transfer from the recorder 1 to the portable device 2 the digest information about the contents yet to be viewed (i.e., yet to be reproduced) from among the contents recorded on the hard disk drive 14. It might happen that the recorder 1 has the capability to move the contents on which at least a predetermined time has elapsed since their recording to the hard disk drive 14, into an auto-delete list, i.e., a list of the contents to be deleted automatically from the hard disk drive 14. In such a case, the digest information about the contents added to the audio-delete list may be transferred from the recorder 1 to the portable device 2.

Settings can be made on the recorder 1 so that digest information may be created whenever a content is recorded to the hard disk drive 14, when the recorder 1 is not subject to a heavy workload, or in otherwise well-timed fashion.

The series of the steps and processes described above may be executed either by hardware or by software. Where the software-based processing is to be carried out, the programs constituting the software may be installed into a computer acting as the recorder 1 as well as into a portable computer serving as the portable device 2.

Figure 11:
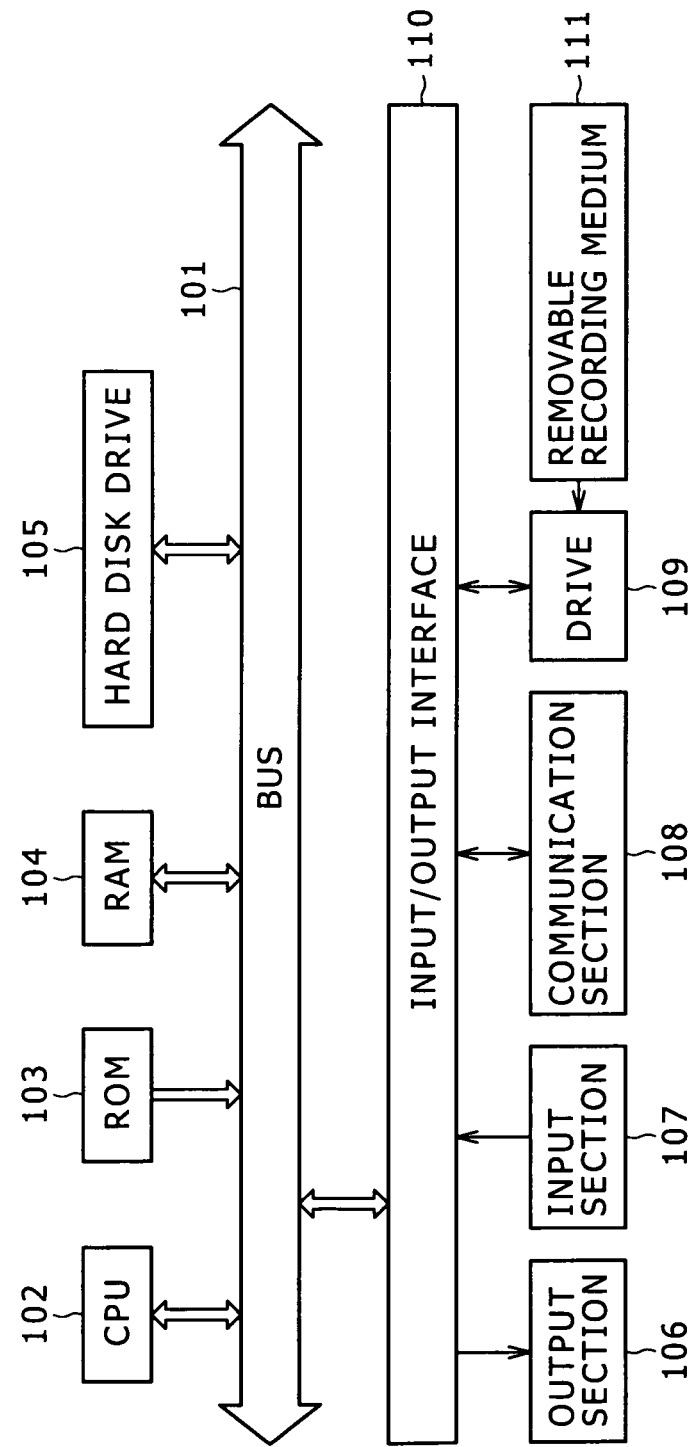
FIG. 11 is a block diagram showing a typical structure of a computer according to one embodiment of the present invention.

FIG. 11 is a block diagram showing a typical structure of a computer in which the programs for carrying out the series of the above-described steps may be installed.

The programs may be recorded beforehand on a hard disk drive 105 or in a ROM 103 serving as an internal recording medium of the computer.

Alternatively, the programs may be stored (i.e., recorded) temporarily or permanently on a removable recording medium 111 such as a flexible disk, CD-ROM (Compact Disc Read Only Memory), DVD (Digital Versatile Disc), magnetic disk, or semiconductor memory. The removable recording medium 111 may be offered as so-called packaged software.

Besides being installed from the above-mentioned removable recording medium 111 into the computer, the programs may be transferred from download sites to the computer wirelessly by satellite for digital satellite broadcasting or in wired fashion over networks such as a LAN (Local Area Network) and the Internet. The computer may receive the transferred programs through a communication section 108 and install the received programs onto an internal hard disk drive 105.

The computer has a CPU (Central Processing Unit) 102 inside. The CPU 102 is connected to an input/output interface 110 by way of a bus 102. Through the input/output interface 110, the CPU 102 admits instructions issued by the user operating an input section 107 typically made up of a keyboard, a mouse, and a microphone. Given the instructions, the CPU 102 executes relevant programs held in the ROM (Read Only Memory) 103. Alternatively, the CPU 102 may acquire relevant programs stored on the hard disk drive 105, programs transferred by satellite or over the network and received by the communication section 108 for installation onto the hard disk drive 105, or programs retrieved from the removable recording medium 11 attached to a drive 109 before being installed onto the hard disk drive 105. The programs thus acquired are then loaded into a RAM (Random Access Memory) 104 for program execution. In this manner, the CPU 102 carries out the steps outlined in the above-described flowcharts as well as the processes described in the block diagrams discussed above. The CPU 102 may, as needed, output the result of its processing through the input/output interface 110 to an output section 106 (typically formed by an LCD (Liquid Crystal Display) and speakers) for AV output purposes, to the communication section 108 for transmission to the outside, or to the hard disk drive 105 for storage.

In this specification, the steps describing the programs for causing the computer to perform diverse processing represent not only the processes that are to be carried out in the sequence depicted by flowcharts (i.e., on a time series basis) but also processes that may be performed parallelly or individually and not chronologically (e.g., in parallel or object-oriented fashion).

The programs may be processed by a single computer (CPU) or by a plurality of computers on a distributed basis.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing system comprising:
    a recording apparatus for recording contents; and
    a portable device suitable for being carried around;
    wherein said recording apparatus includes:
    a recording control section configured to record contents to a recording medium,
    a selection section configured to select a content, from among the contents recorded on said recording medium, as a target content to be transferred, in accordance with a determination that a selecting operation is performed for the content,
    a creation section configured to create digest information summarizing said target content and indicating whether a first content of the contents is on a list of contents for automatic deletion, wherein the first content is placed on the list of contents for automatic deletion if a predetermined time has elapsed since the recording of the first content to the recording medium,
    a digest information transfer control section configured to transfer to said portable device, when said portable device is connected to said recording apparatus, a digest information set constituted by said digest information and by identification information identifying said target content, said digest information about said target content and said identification information being associated with each other,
    an operation information reception control section configured to receive from said portable device, when said portable device is connected to said recording apparatus, an operation information set constituted by said identification information and by operation information about an operation performed on said portable device with regard to said digest information about said target content identified by said identification information, said identification information and said operation information being associated with each other, and
    an operation information reflection section configured to perform a process on said target content identified by said identification information in said operation information set, said process corresponding to said operation information associated with said identification information, and
    said portable device includes:
    a digest information reception control section configured to receive said digest information set from said recording apparatus when said portable device is connected to said recording apparatus, and
    an operation information transfer control section configured to transfer to said recording apparatus, when said portable device is connected to said recording apparatus, said operation information set constituted by said operation information about the operation performed with regard to said digest information in said digest information set and by said identification information corresponding to said digest information, said operation information and said identification information being associated with each other,
    wherein said operation information set is generated at said portable device when said portable device is not connected to said recording apparatus.

2. The information processing system of claim 1, wherein the selecting operation is performed for the content by a user operation on a selection screen displaying information respectively identifying the contents.

3. A recording apparatus for recording contents, comprising:
    a recording control section configured to record contents to a recording medium;
    a selection section configured to select a content, from among the contents recorded on said recording medium, as a target content to be transferred, in accordance with a determination that a selecting operation is performed for the content;
    a creation section configured to create digest information summarizing said target content and indicating whether a first content of the contents is on a list of contents for automatic deletion, wherein the first content is placed on the list of contents for automatic deletion if a predetermined time has elapsed since the recording of the first content to the recording medium;
    a digest information transfer control section configured to transfer to a portable device, when connected to said portable device, a digest information set constituted by said digest information and by identification information identifying said target content, said digest information about said target content and said identification information being associated with each other;
    an operation information reception control section configured to receive from said portable device, when connected to said portable device, an operation information set constituted by said identification information and by operation information about an operation performed on said portable device with regard to said digest information about said target content identified by said identification information, said identification information and said operation information being associated with each other, wherein said operation information set is generated at said portable device when said recording apparatus is not connected to said portable device; and
    an operation information reflection section configured to perform a process on said target content identified by said identification information in said operation information set, said process corresponding to said operation information associated with said identification information.

4. The recording apparatus according to claim 3, wherein said operation information reflection section performs the process on said target content identified by said identification information in said operation information set, said process corresponding to said operation information associated with said identification information, said process involving deleting said target content, recording said target content to another recording medium, reserving said target content for unattended recording, or protecting said target content against erasure.

5. The recording apparatus according to claim 3, wherein said digest information includes a title of said target content, a leading part of said target content, image data constituting a frame of said target content detected as a key frame, a thumbnail image of said target content, text data about said target content, or audio data included in said target content.

6. An information processing method for use with a recording apparatus for recording contents, said information processing method comprising the steps of:

selecting a content, from among a plurality of contents recorded on a recording medium, as a target content to be transferred, in accordance with a determination that a selecting operation is performed for the content;

creating digest information summarizing said target content and indicating whether a first content of the plurality of contents is on a list of contents for automatic deletion, wherein the first content is placed on the list of contents for automatic deletion if a predetermined time has elapsed since the recording of the first content to the recording medium;

transferring, when said recording apparatus is connected to a portable device, to said portable device a digest information set constituted by said digest information and by identification information identifying said target content, said digest information about said target content and said identification information being associated with each other;

receiving from said portable device an operation information set, when said portable device is reconnected to said recording apparatus after said portable device is disconnected from said recording apparatus, in which the operation information set is generated at said portable device when the portable device is disconnected from the recording apparatus and constituted by said identification information and by operation information about an operation performed on said portable device with regard to said digest information about said target content identified by said identification information, said identification information and said operation information being associated with each other; and performing a process on said target content identified by said identification information in said operation information set, said process corresponding to said operation information associated with said identification information.

7. A program embodied in a non-transitory computer readable medium run on a computer by a recording apparatus for recording contents, said program causing said computer functionally to implement said recording apparatus comprising:

a recording control section configured to record contents to a recording medium;

a selection section configured to select a content, from among the contents recorded on said recording medium, as a target content to be transferred, in accordance with a determination that a selecting operation is performed for the content;

a creation section configured to create digest information summarizing said target content and indicating whether a first content of the contents is on a list of contents for automatic deletion, wherein the first content is placed on the list of contents for automatic deletion if a predetermined time has elapsed since the recording of the first content to the recording medium;

a digest information transfer control section configured to transfer to a portable device, when connected to said portable device, a digest information set constituted by said digest information and by identification information identifying said target content, said digest information about said target content and said identification information being associated with each other;

an operation information reception control section configured to receive from said portable device, when connected to said portable device, an operation information set constituted by said identification information and by operation information about an operation performed on said portable device with regard to said digest information about said target content identified by said identification information, said identification information and said operation information being associated with each other, wherein said operation information set is generated at said portable device when said recording apparatus is not connected to said portable device; and an operation information reflection section configured to perform a process on said target content identified by said identification information in said operation information set, said process corresponding to said operation information associated with said identification information.

8. A portable device suitable for being carried around, comprising:

a digest information reception control section configured to receive a digest information set from a recording apparatus for recording contents when said recording apparatus is connected to said portable device, said digest information set being constituted by digest information about a target content and by identification information identifying said target content, said digest information about said target content and said identification information being associated with each other, in which said target content is a content selected from among a plurality of contents recorded on a recording medium of said recording apparatus, in accordance with a determination that a selecting operation is performed for the content, in which the digest information indicates whether a first content of the plurality of contents is on a list of contents for automatic deletion, wherein the first content is placed on the list of contents for automatic deletion if a predetermined time has elapsed since the recording of the first content to the recording medium;

an operation section configured to generate an operation information set constituted by operation information about an operation performed with regard to said digest information in said digest information set and by said identification information corresponding to said digest information, said operation information and said identification information being associated with each other, wherein said operation information set is generated when said recording apparatus is not connected to said portable device; and an operation information transfer control section configured to transfer said operation information set to said recording apparatus when said recording apparatus is connected to said portable device.

9. The portable device according to claim 8, wherein said operation information designates execution of a process involving deleting said target content, recording said target content to a recording medium, reserving said target content for unattended recording, or protecting said target content against erasure.

10. The portable device according to claim 8, wherein said digest information includes a title of said target content, a leading part of said target content, image data constituting a frame of said target content detected as a key frame, a thumbnail image of said target content, text data about said target content, or audio data included in said target content.

11. An information processing method for use with a portable device suitable for being carried around, said information processing method comprising the steps of:

receiving a digest information set from a recording apparatus for recording content, when said portable device is connected to the recording apparatus for recording contents, said digest information set being constituted by digest information about a target content and by identification information identifying said target content, said digest information about said target content and said identification information being associated with each other, in which said target content is a content selected from among a plurality of contents recorded on a recording medium of said recording apparatus, in accordance with a determination that a selecting operation is performed for the content, in which the digest information indicates whether a first content of the plurality of contents is on a list of contents for automatic deletion, wherein the first content is placed on the list of contents for automatic deletion if a predetermined time has elapsed since the recording of the first content to the recording medium;

generating, when said portable device is disconnected from said recording apparatus, an operation information set constituted by operation information about an operation performed with regard to said digest information in said digest information set and by said identification information corresponding to said digest information, said operation information and said identification information being associated with each other; and transferring said operation information set to said recording apparatus, when said portable device is reconnected to the recording apparatus.

12. A program embodied in a non-transitory computer readable medium run on a computer by a portable device suitable for being carried around, said program causing said computer functionally to implement said portable device comprising:

a digest information reception control section configured to receive a digest information set from a recording apparatus for recording contents when said recording apparatus is connected to said portable device, said digest information set being constituted by digest information about a target content and by identification information identifying said target content, said digest information about said target content and said identification information being associated with each other, in which said target content is a content selected from among a plurality of contents recorded on a recording medium of said recording apparatus, in accordance with a determination that a selecting operation is performed for the content, in which the digest information indicates whether a first content of the plurality of contents is on a list of contents for automatic deletion, wherein the first content is placed on the list of contents for automatic deletion if a predetermined time has elapsed since the recording of the first content to the recording medium; and an operation section configured to generate an operation information set constituted by operation information about an operation performed with regard to said digest information in said digest information set and by said identification information corresponding to said digest information, said operation information and said identification information being associated with each other, wherein said operation information set is generated when said recording apparatus is not connected to said portable device; and an operation information transfer control section configured to transfer said operation information set to said recording apparatus when said recording apparatus is connected to said portable device.

13. A recording apparatus for recording contents, comprising:

recording control means for recording contents to a recording medium;

selection means for selecting a content, from among the contents recorded on said recording medium, as a target content to be transferred, in accordance with a determination that a selecting operation is performed for the content;

creation means for creating digest information summarizing said target content and indicating whether a first content of the contents is on a list of contents for automatic deletion, wherein the first content is placed on the list of contents for automatic deletion if a predetermined time has elapsed since the recording of the first content to the recording medium;

digest information transfer control means for transferring to a portable device, when connected to said portable device, a digest information set constituted by said digest information and by identification information identifying said target content, said digest information about said target content and said identification information being associated with each other;

operation information reception control means for receiving from said portable device, when connected to said portable device, an operation information set constituted by said identification information and by operation information about an operation performed on said portable device with regard to said digest information about said target content identified by said identification information, said identification information and said operation information being associated with each other, wherein said operation information set is generated at said portable device when said recording apparatus is not connected to said portable device; and operation information reflection means for performing a process on said target content identified by said identification information in said operation information set, said process corresponding to said operation information associated with said identification information.

14. A portable device suitable for being carried around, comprising:

digest information reception control means for receiving a digest information set from a recording apparatus for recording contents when said recording apparatus is connected to said portable device, said digest information set being constituted by digest information about a target content and by identification information identifying said target content, said digest information about said target content and said identification information being associated with each other, in which said target content is a content selected from among a plurality of contents recorded on a recording medium of said recording apparatus, in accordance with a determination that a selecting operation is performed for the content, in which the digest information indicates whether a first content of the plurality of contents is on a list of contents for automatic deletion, wherein the first content is placed on the list of contents for automatic deletion if a predetermined time has elapsed since the recording of the first content to the recording medium; and operation means for generating an operation information set constituted by operation information about an operation performed with regard to said digest information in said digest information set and by said identification information corresponding to said digest information, said operation information and said identification information being associated with each other, wherein said operation information set is generated when said recording apparatus is not connected to said portable device; and an operation information transfer control means for transferring said operation information set to said recording apparatus when said recording apparatus is connected to said portable device.

* * * * *